(12) United States Patent
Landherr et al.

(10) Patent No.: US 6,880,156 B1
(45) Date of Patent: Apr. 12, 2005

(54) DEMAND RESPONSIVE METHOD AND APPARATUS TO AUTOMATICALLY ACTIVATE SPARE SERVERS

(75) Inventors: Steven R Landherr, Dallas, TX (US); Thomas Edwin Turicchi Jr., Dallas, TX (US)

(73) Assignee: Hewlett-Packard Development Company. L.P., Houston, TX (US)

( * ) Notice: Subject to any disclaimer, the term of this patent is extended or adjusted under 35 U.S.C. 154(b) by 673 days.

(21) Appl. No.: 09/626,627

(22) Filed: Jul. 27, 2000

(51) Int. Cl.[7] .......................... G06F 9/46; G06F 15/16
(52) U.S. Cl. ............................ 718/105; 709/229
(58) Field of Search ......................... 718/104, 105; 709/223–229

(56) References Cited

U.S. PATENT DOCUMENTS

| | | | | |
|---|---|---|---|---|
| 5,761,507 A | * | 6/1998 | Govett | 709/101 |
| 5,774,660 A | * | 6/1998 | Brendel et al. | 709/201 |
| 5,774,668 A | * | 6/1998 | Choquier et al. | 709/223 |
| 5,828,847 A | * | 10/1998 | Gehr et al. | 709/239 |
| 6,035,281 A | * | 3/2000 | Crosskey et al. | 705/14 |
| 6,119,162 A | * | 9/2000 | Li et al. | 709/227 |
| 6,185,601 B1 | * | 2/2001 | Wolff | 709/203 |
| 6,249,801 B1 | * | 6/2001 | Zisapel et al. | 709/105 |
| 6,259,705 B1 | * | 7/2001 | Takahashi et al. | 370/465 |
| 6,263,361 B1 | * | 7/2001 | Hoyer et al. | 709/203 |
| 6,317,786 B1 | * | 11/2001 | Yamane et al. | 709/224 |
| 6,389,448 B1 | * | 5/2002 | Primak et al. | 709/105 |
| 6,539,494 B1 | * | 3/2003 | Abramson et al. | 714/4 |
| 6,560,717 B1 | * | 5/2003 | Scott et al. | 714/4 |
| 6,571,288 B1 | * | 5/2003 | Sarukkai | 709/226 |
| 6,601,084 B1 | * | 7/2003 | Bhaskaran et al. | 709/105 |
| 6,618,820 B1 | * | 9/2003 | Krum | 714/3 |

FOREIGN PATENT DOCUMENTS

| | | | | |
|---|---|---|---|---|
| JP | 100187467 A | 7/1998 | | G06F/9/46 |
| WO | WO00/10084 A2 | 2/2000 | | G06F/9/46 |
| WO | WO01/80002 A1 | 10/2001 | | G06F/9/50 |

\* cited by examiner

*Primary Examiner*—William A. Cuchlinski, Jr.
*Assistant Examiner*—Yemane M. Gerezgiher

(57) ABSTRACT

A server and method of its operation adapt the number of server applications within the server. The server is connected to a computer network. The server comprises one or more active server applications, a load detector, an inactive additional server application and an allocator. The load detector, which may be part of a load balancer, is connected to the one or more server applications and the computer network. The allocator is connected to the load detector and the additional server application. The allocator causes the additional server application to activate in response to a load condition. The method measures a load on the server, detects when the load exceeds a threshold and, in response thereto, activates an additional server application on the server. Optionally, the method also detects when the load is less than a deactivation threshold, and in response thereto, deactivates the additional server application. Also disclosed is a system comprising a plurality of computers, one or more connections to one or more servers, and a module. Each of the computers is capable of hosting a server application. The module is connected to the: computers and the connection(s). The module receives a request for an additional server application from one of the servers. Such a request may, for example, be generated when the server is experiencing a surge. In response to the request, the module activates the server application on one or more of the computers so as to support the requesting server.

20 Claims, 5 Drawing Sheets

DEMAND RESPONSIVE METHOD AND APPARATUS TO AUTOMATICALLY ACTIVATE SPARE SERVERS

FIELD OF THE INVENTION

This invention relates generally to computer networks, and more particularly to the automatic adaptation of a server on a computer network.

BACKGROUND OF THE INVENTION

FIG. 1 illustrates a computer network 105 connecting a client 110 and a conventional server 130. The computer network 105 may be a public network, such as the Internet, or a private network, such as a LAN, MAN or WAN. The client 10 is a computer, such as a personal computer, hand held Internet terminal, Internet enabled television terminal or Internet enabled cellular telephone. The server 130 may host a website on the Internet, for example. The server 130 comprises a server application 115 redundantly provisioned in several (say, M) computers. Each server application 115-1 through 115-M is stateless (i.e., operation does not depend upon the historical state of the server application 115-1 through 115-M) and identical. A load balancer 120 connects between the computer network 105 and the server applications 115-1 through 115-M. The load balancer 120 routes connections to the server applications 115 in an even handed way. When the client 110 requests a connection to the server application 115 (in the aggregate, without distinction to a specific one of the redundant instances of the server application 115-1 through 115-M), the load balancer 120 receives the request and forwards the request to the least loaded server application 115. The server applications optionally connect to a separate centralized database 125, as shown. Alternatively, each server application II 5 can include its own copy of the database 125. Together the server applications 115, the load balancer 120 and the database 125 appear to the client 110 as a single entity—the server 130—on the computer network 105.

The server 130 illustrated in FIG. 1 is ill-equipped to deal with surges in demand. Surges can arise for a myriad of reasons. For example, when the computer network 105 is highly dynamic, as is the Internet, the pattern of usage of a website server is highly variable and subject to change quickly. Frequently demand for a website surges, as its popularity increases dramatically. The arrival and duration of surges are difficult to predict. When a surge occurs, the level of service provided to all users can drop significantly, causing discontent among the users of the website. This surge-induced drop-off in service can counteract the website's initial popularity, causing the initial popularity to be merely temporary, as users refuse to tolerate slow responses or denied connection requests. If the surge is attributable to investments in advertising or other good fortune, then the drop-off in service can limit any gains expected to result from the, investment or good fortune.

In the framework of FIG. 1, there are two approaches for dealing with surges. The first approach is the over-provision of server applications 115. That is, a sufficient number of server applications 115 are provided to handle peak demand. A disadvantage of this approach is that it is difficult to predict precisely how many server applications 115 are needed to handle future surges. Another disadvantage of this approach is that some of the server applications 115 sit idle a great majority of the time. Over-provision is therefore difficult to plan effectively and extremely inefficient, even if planned effectively.

The second approach is a manual reaction to a surge. According to this approach, a human operator notices that demand exceeds server capacity and manually purchases additional server applications 115. This approach is severely limited in several respects. First, there is a significant time lag between the surge of demand and the operation of the new server applications. Second, once a new server application has been purchased, it will remain allocated and idle during periods of low demand. Thus, manual reaction is a slow and inefficient way of dealing with surges.

SUMMARY OF THE INVENTION

In a first respect, the invention is a server connected to a computer network. The server comprises one or more active server applications, a load detector, an additional server application that is inactive and an allocator. The load detector, which may be part of a load balancer, is connected to the one or more server applications and the computer network. The allocator is connected to the load detector and the additional server application. The allocator causes the additional server application to activate in response to a load condition.

In another respect, the invention is a method of adapting the number of server applications within a logical server. The method measures a load on the server, detects when the load exceeds a threshold and, in response thereto, activates an additional server application on the server. Optionally, the method also detects when the load is less than a deactivation threshold, and in response thereto, deactivates the additional server application.

In yet another respect, the invention is a system comprising a plurality of computers, one or more connections to one or more servers, and a module. Each of the computers is capable of hosting a server application. The module is connected to the computers and the connection(s). The module receives a request for an additional server application from one of the servers. Such a request may, for example, be generated when the server is experiencing a surge. In response to the request, the module activates the server application on one or more of the computers so as to support the requesting server.

In comparison to known prior art, certain embodiments of the invention are capable of achieving certain advantages, including some or all of the following: (1) Surges in server demand can be accommodated automatically, with little or no human intervention; (2) surges in server demand can be accommodated quickly, minimizing the duration of surge-induced service drop-offs; and (3) server resources can be allocated and used efficiently; in other words, wasteful over-capacity is minimized or eliminated. Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

Figure 1:
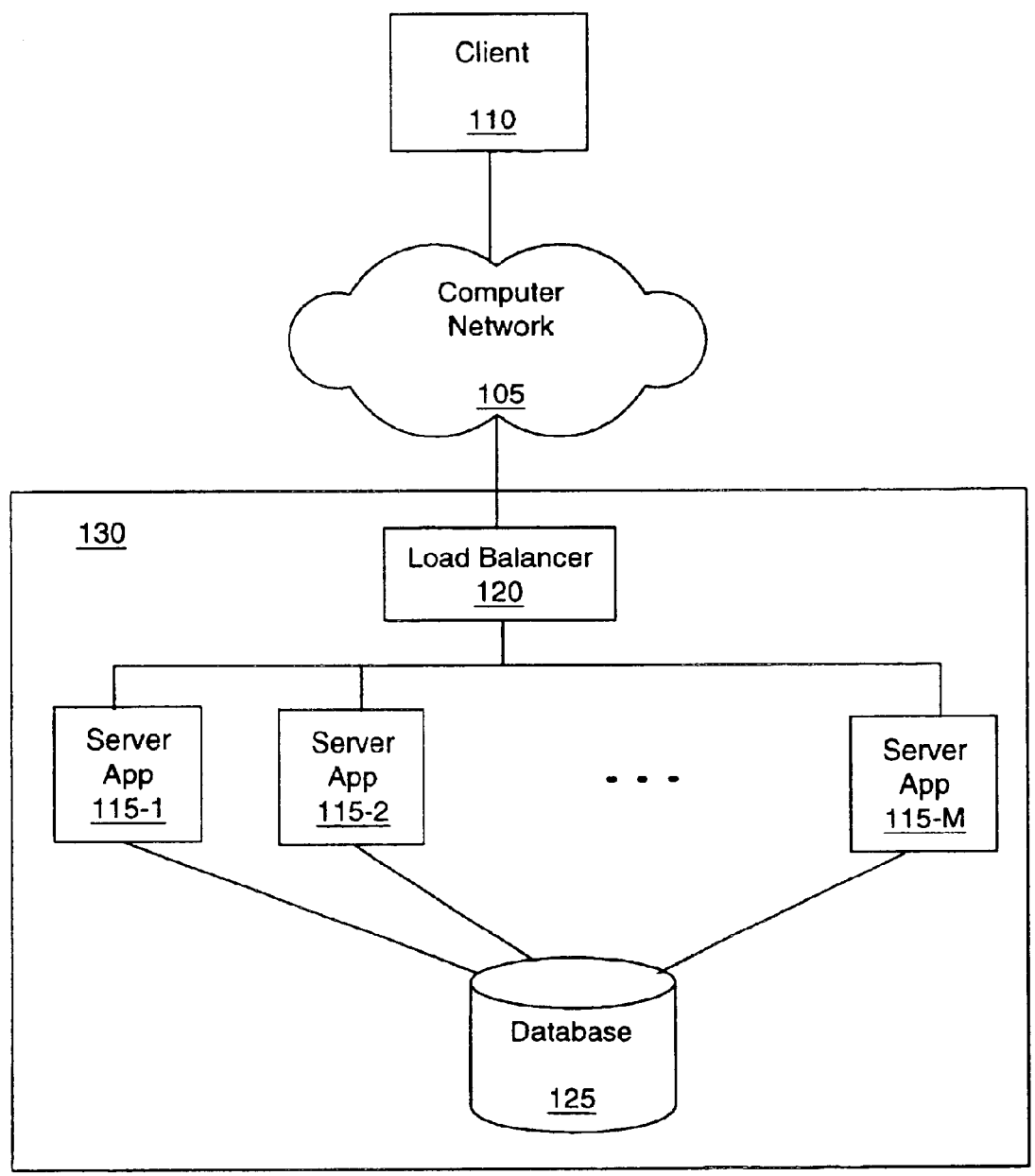
FIG. 1 illustrates a computer network connecting a client and a conventional server.
Figure 2:
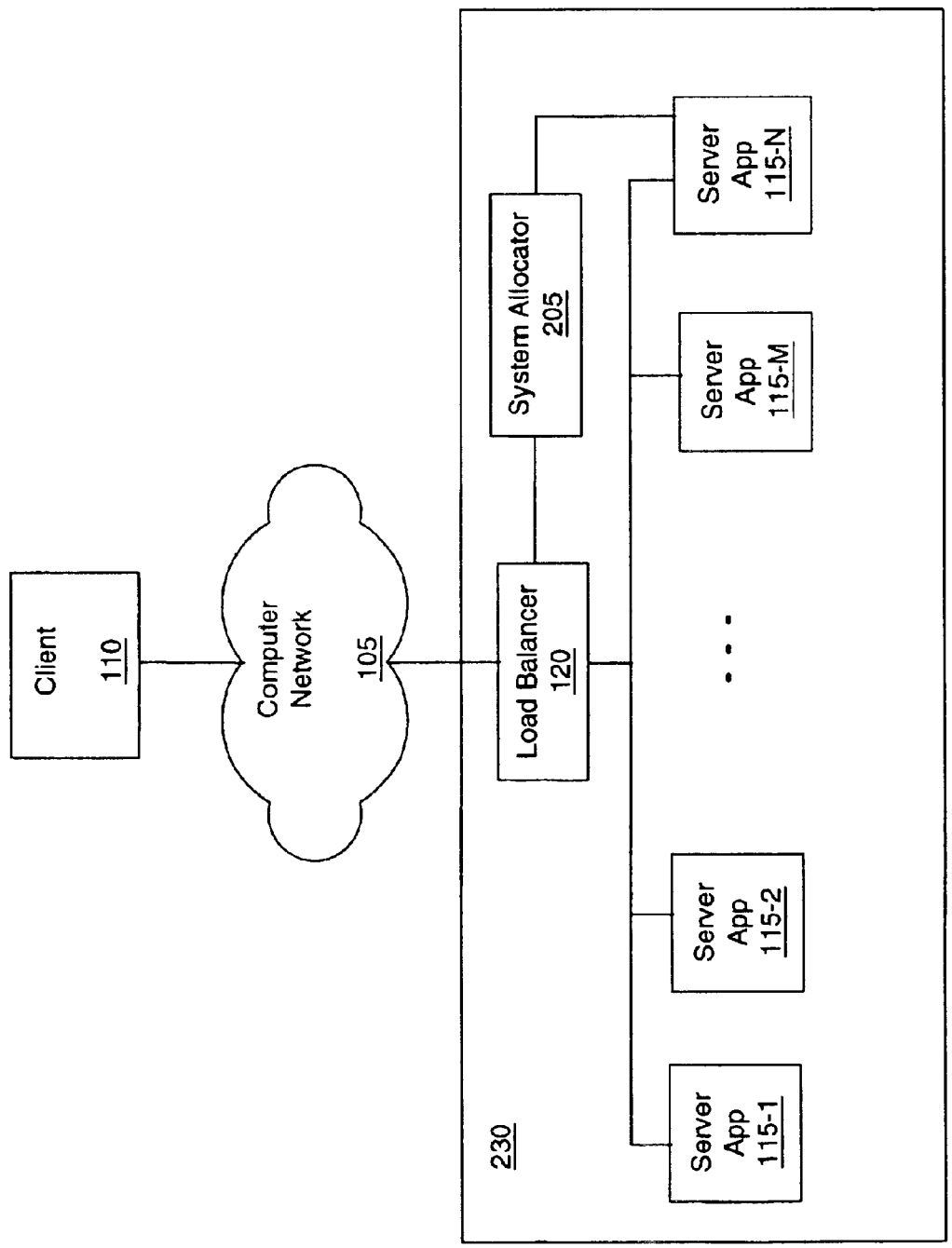
FIG. 2 illustrates a computer network connecting a client and a server, according to one embodiment of the invention.

FIG. 2 illustrates the computer network 105 connecting the client 110 and a server 230, according to one embodiment of the invention. The server 230, like the server 130 of FIG. 1, comprises a load balancer 120 and a plurality of server applications 115-1 through 115-M. However, the server 230, unlike the server 130, additionally comprises a system allocator 205 and an additional server application 115-N. In an initial state, the server application 115, is redundantly provided by the M systems, as shown. The additional server application 115-N is initially off-line and not utilized for this use. Preferably, the computer on which the additional server application 115-N runs is powered up but not loaded with the pertinent software. In the initial state, the computer on which the additional server application 115-N runs may be loaded with and executing other software that can be interrupted when the additional server application 115-N is brought on-line. The additional server application 115-N is preferably owned by a computer vendor and not the owner of the server 230 (or the rest of the server 230). During the initial state, when the additional server application 115-N is off-line, the server 230 owner is not charged for the additional server application 115-N. According to one billing technique, only when the additional server application 115-N is brought on-line, as described below, and remains on-line does the server 230 owner pay for the use of the additional server application 115-N. According to another billing technique, server 230 owner pays for all time the server application 115-N is in use for the server 230 owner, even if it is returned to the off-line state due to a decrease in service demand and running interruptible software applications for the server 230 owner. The additional server application 115-N can be remotely located from the rest of the server 230 and connected to the rest of the server 230 by a dedicated connection (e.g., data line or modem phone line) or through the computer network 105 or another network. For example, additional server application 115-N can be located on the premises of a computer vendor.

The system allocator 205 is connected to a load detector or a load measurement unit in the load balancer 120. The system allocator 205 monitors the load measured by the load detector and signals the additional server application 115-N to activate (i.e., become operational on-line) when the load is excessive. The system allocator also preferably deactivates the additional server application 115-N when the load falls.

Figure 3:
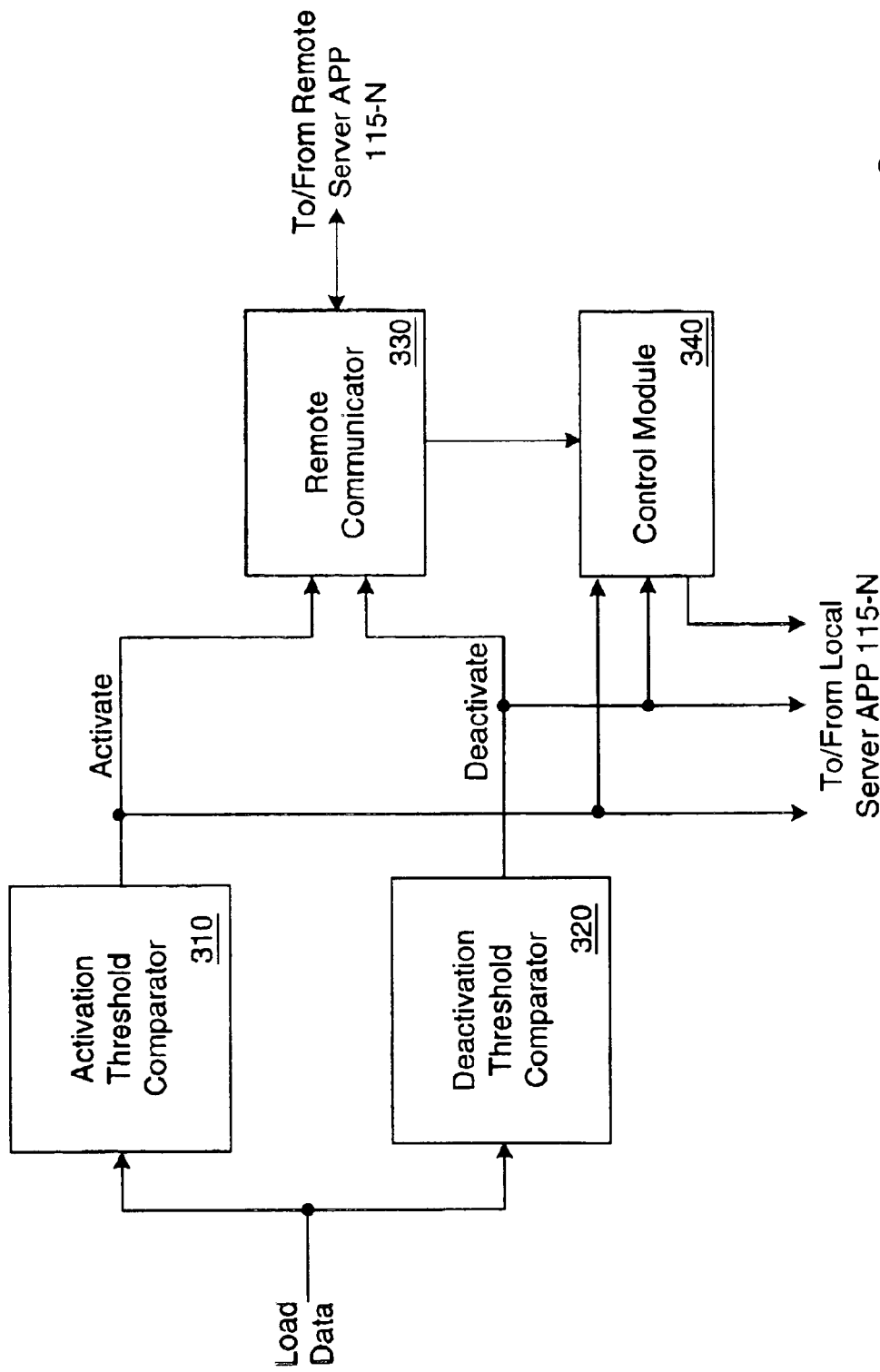
FIG. 3 is a block diagram of the allocator of FIG. 2.

FIG. 3 is a block diagram of the system allocator 205 in greater detail. The system allocator 205 comprises an activation threshold comparator 310, a deactivation threshold comparator 320, an optional remote communicator 330 and a control module 340. Load data from a load detector in the load balancer 120 is input to both the activation threshold comparator 310 and the deactivation threshold comparator 320. If the load is greater than (or possibly equal to) an activation threshold, then the activation threshold comparator 310 asserts an activate signal. If the load is less than (or possibly equal to) a deactivation threshold, then the deactivation threshold comparator 320 asserts an deactivate signal. Both the activate signal and the deactivate signal are connected to the local additional server application 115-N and/or a remote additional server application 115-N. The connection to a remote additional server application 115-N is via a remote communicator 330, which may be a modem, serial bus interface or network interface (possibly to the computer network 105), for example. The control module 340 receives the activate and deactivate signals as well as notifications from the additional server application(s). The control module 340, which is preferably a microprocessor or microcontroller, generally controls the functions of the system allocator 205. For example, the control module 340 is able to set the activation threshold and the deactivation threshold (by connections not shown), as described below. One skilled in the art will readily appreciate that some or all of the components of the system allocator 205, as just described, can be combined with the load balancer 120 to result in an enhanced load balancer.

The activation and deactivation thresholds can be set in a variety of ways, including the following three illustrative techniques. According to a first technique, each server application is known to be able to handle some number of connections per second (say, C) while providing acceptable service. Periodically, the load detector sends the average number of connections per second received (R) over that period in seconds (P) to the activation and deactivation threshold comparators 310 and 320. The activation threshold comparator 310 asserts the activate signal when a condition in any row of the following table is true, where R is a current measurement of connections per second from the load detector; C is the maximum connections per second each server application can handle; M is the current number of server applications on-line; and r is the connections per second measurement from some time in the past (e.g., 10 minutes ago):

| R/(C*M)   | AND | (R − r)/r |
| --------- | --- | --------- |
| 0.25–0.50 | AND | >1.0      |
| 0.50–0.67 | AND | >0.5      |
| 0.67–0.75 | AND | >0.33     |
| 0.75–0.80 | AND | >0.25     |
| 0.80–0.90 | AND | >0.10     |
| >0.90     | AND |           |

The first column represents the current capacity level, normalized to one. The third column represents the rate at which demand for the service is changing. Threshold values (e.g., 0.25, 0.50, 0.67, 0.33) may vary by implementation.

The deactivation threshold comparator 320 preferably asserts the deactivate signal for 1% of the currently active server applications when R/(C*M)<0:80 and (R−r)/r≦0 for the previous 10 minute period (which is cited as an illustrative period of time throughout this document).

According to a second technique, the system allocator 205 asserts the activate signal when all on-line server applications are at or above 90% CPU utilization for 10 minutes, and asserts deactivation when all on-line server applications are below 80% CPU utilization for 10 minutes. The percentages 80% and 90% are illustrative values, as used herein. Threshold values may vary by implementation.

According to a third technique, each server application is known to be able to handle S user sessions or logins. The system allocator 205 asserts the activate signal when all on-line server applications are at or above 90% of their session capacity for 10 minutes, and asserts the deactivate signal when all on-line server applications are below 80% of their session capacity for 10 minutes.

Figure 4:
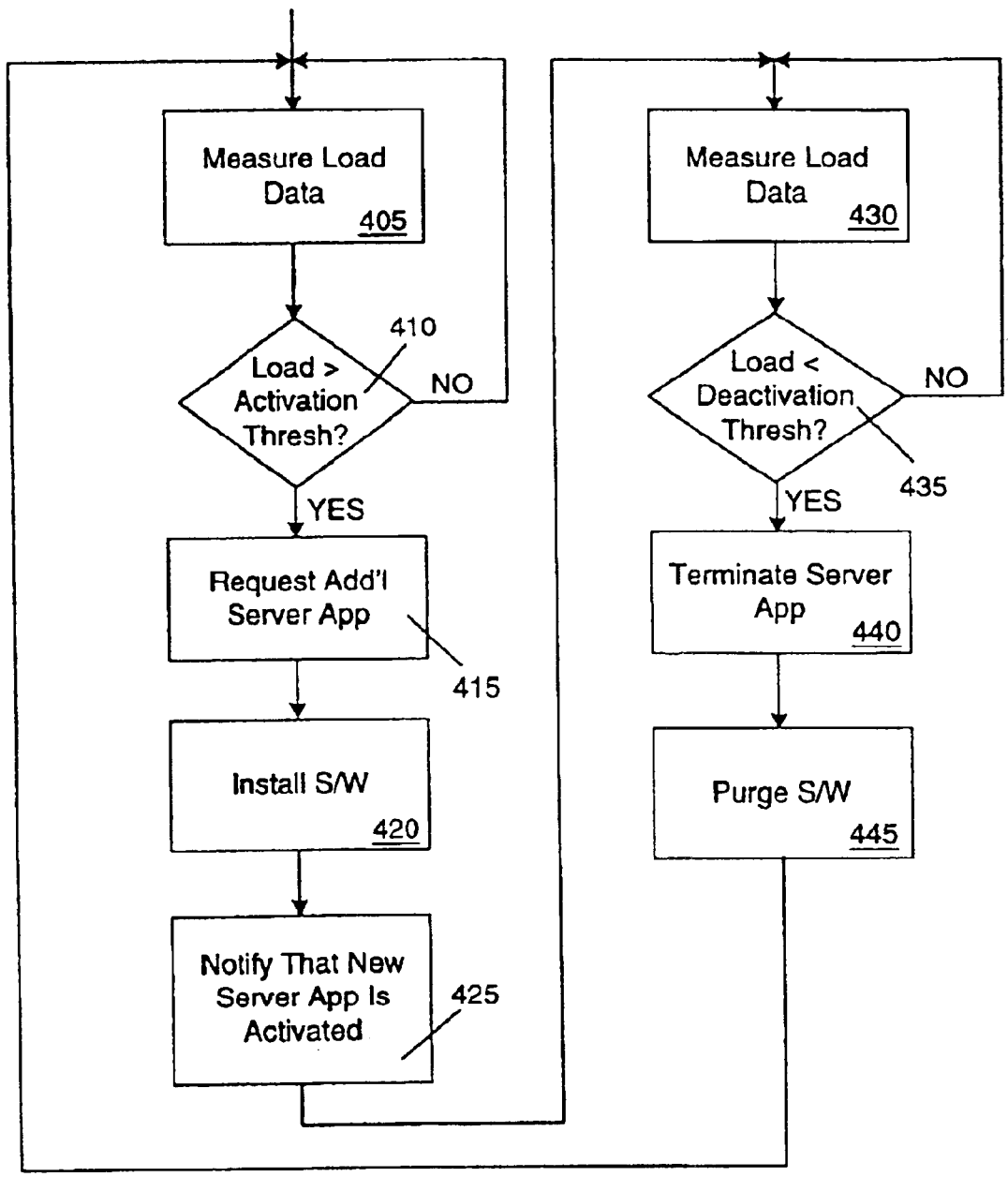
FIG. 4 is a flowchart of a method according to the invention.

FIG. 4 is a flowchart of a method 400 according to the invention. The method 400 measures (405) load data at a server. The method 400 compares (410) the load to an activation threshold. If the load is less than the activation threshold, the method 400 loops back to the measuring step 405 and takes no other action. If the load exceeds the activation threshold, then the method 400 requests (415) an additional server application to help service the load. The method 400 next installs (420) the necessary software. The installation step 420 may involve substeps of installing an operating system software and/or other prerequisite software and then installing and configuring the server application. When the server application is ready and operational, the method 400 notifies (425) the server of its readiness. At this point, the load is serviced by one more server application, so that the load per server application is decreased. The method 400 continues to measure (430) load data and compare (435) the load to a deactivation threshold. When the load is below the deactivation threshold, then the server application is terminated (440) and purged (445). Some or all of the prerequisite software may be purged (445) as well. The method 400 then returns to the measuring step 405 for possible repetition(s).

Figure 5:
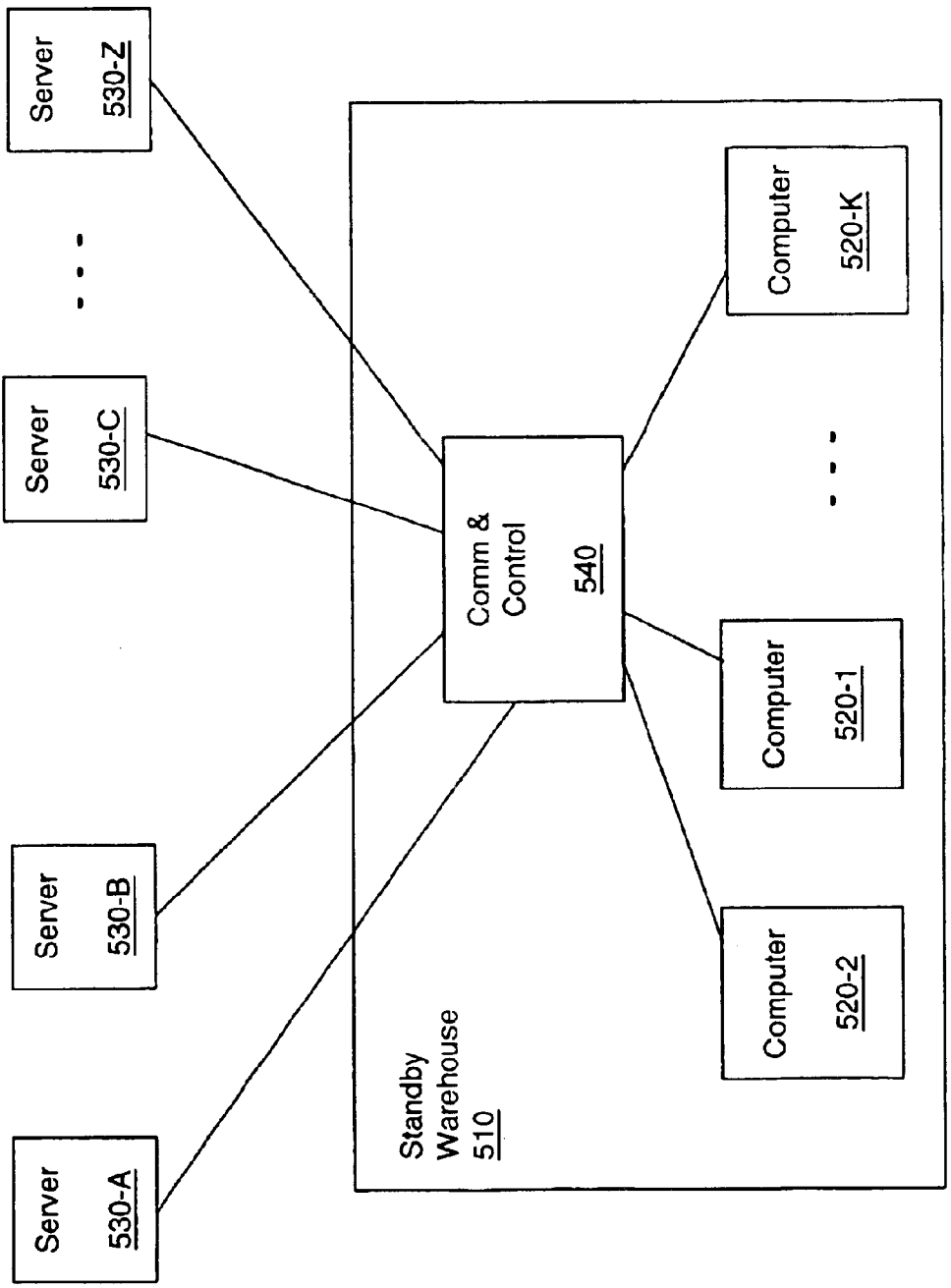
FIG. 5 is a block diagram of a warehouse of standby servers according to an embodiment of the invention.

FIG. 5 illustrates a standby warehouse 510 according to an embodiment of the invention. The standby warehouse 510 comprises a number (say, K) computers 520-1 through 520-K. Each of the computers 520 is ready to host a server application for any one of a number of possibly dissimilar servers 530. A communication and control module 540 receives requests for additional server applications from the servers 530 and matches those requests with an available computer 520. The communication and control module 540 also preferably logs which server 530 is using which computer 520 and the length of usage for usage based billing. As an example of use, the computer 520-1 may be loaded with an server application X when the server 530-X experiences a surge. When the server X surge has subsided, the additional server application X is deactivated on the computer 520-1. Thereafter, the computer 520-1 is available to help handle surges on any other server 530. The next time server 530-X experiences a surge, the communications and control module 540 may answer the request for an additional server application by providing a different computer 520 (say, 520-2, if it is available). Thus, the standby warehouse 510 can efficiently handle surges for a great number of possible servers, providing computing resources wherever they are most needed.

What has been described and illustrated herein is a preferred embodiment of the invention along with some of its variations. The terms, descriptions and figures used herein are set forth by way of illustration only and are not meant as limitations. In particular, note that although only a single additional server application 115-N has been described, the principals of the invention are applicable to bringing any number of additional server applications on-line either serially or in parallel. Those skilled in the art will recognize that these and many other variations are possible within the spirit and scope of the invention, which is intended to be defined by the following claims —and their equivalents—in which all terms are meant in their broadest reasonable sense unless otherwise indicated.

What is claimed is:

1. A server connected to a computer network, the server comprising:
   one or more active server applications;
   a load detector connected to the one or more server applications and the computer network;
   an additional server application that is inactive; and
   an allocator connected to the load detector and the additional server application;
   wherein the allocator causes the additional server application to activate in response to a load condition and wherein an activation threshold is based at least in part on a ratio of a current number of connections per unit time to a past number of connections per unit time.

2. The server of claim 1 further comprising: a load balancer connected to the load detector.

3. The server of claim 1 wherein each server application runs on a separate computer.

4. The server of claim 1 wherein the additional server application is in a power-on condition.

5. The server of claim 1 wherein the additional server application is owned by a computer vendor.

6. The server of claim 1 wherein the additional server is remotely located from the one or more server applications.

7. The server of claim 6 wherein the allocator comprises a modem connected to the location of the additional server.

8. The server of claim 1 wherein the allocator comprises a load threshold comparator.

9. The server of claim 1 wherein the allocator comprises a log file in which the activation of the additional server is logged.

10. A method of adapting the number of server applications within a server, the method comprising:
    measuring a load on the server;
    detecting when the load exceeds an activation threshold; and
    in response to the detecting step, employing a system allocator to activate an additional server application on the server;
    wherein the additional server application is connected to the server via the system allocator and wherein an activation threshold is based at least in part on a ratio of a current number of connections per unit time to a past number of connections per unit time.

11. The method of claim 10 wherein the load measuring step comprises one or more of the group selected from measuring CPU utilization, measuring a percentage of session usage, and measuring the rate of change of demand.

12. The method of claim 10 wherein the activation threshold is based on the quantities $R/(C*M)$ and $(R-r)/r$ wherein R is a current number of connections per unit time, C1 is a maximum number of connections per unit time, M is the number of server applications currently activated, and r is a past number of connections per unit time.

13. The method of claim 10 wherein the activating step comprises:
    loading an operating system on the additional server application; and configuring the operating system.

14. The method of claim 10 wherein the activating step comprises:
    electronically contacting a computer vendor to request the additional server application.

15. The method of claim 10 wherein the activating step comprises:
    using the additional server to accommodate a surge.

16. The method of claim 10 further comprising: logging the activating step.

17. The method of claim 10 further comprising:
    detecting when the load is less than a deactivation threshold; and
    in response to the minimum detecting step, deactivating the additional server application.

18. A system comprising:
    a plurality of computers, each computer capable of hosting a server application;
    one or more connections to one or more servers; and a module connected to the one or more connections and the plurality of computers;

wherein the module receives a request for an additional server application from one of the plurality of servers and, in response, activates the server application on one or more of the plurality of computers so as to support the requesting server;

wherein said server application is connected to the requesting server via the module and wherein an activation threshold is based at least in part on a ratio of a current number of connections per unit time to a past number of connections per unit time.

19. The system of claim 18 wherein at least some of the one or more servers are Internet website servers.

20. The system of claim 18 further comprising a computer usage log, whereby usage-based billing can be derived.

* * * * *